United States Patent [19]

Moore et al.

[11] Patent Number: 5,125,952
[45] Date of Patent: Jun. 30, 1992

[54] STORAGE-STABLE MELAMINE DISPERSION

[75] Inventors: William P. Moore, Hopewell, Va.; John H. Detrick, Baton Rouge, La.

[73] Assignee: Melamine Chemicals, Inc., Donaldsonville, La.

[21] Appl. No.: 82,235

[22] Filed: Aug. 6, 1987

[51] Int. Cl.$^5$ ................................................. C05C 9/00
[52] U.S. Cl. ............................................ 71/28; 71/29; 71/30; 71/64.08; 71/903; 71/904
[58] Field of Search ...................... 71/1, 11, 27, 28–30, 71/64.08, 903, 904

[56] References Cited

U.S. PATENT DOCUMENTS 4,644,015  2/1987  Scaccia et al. ................. 521/129

Primary Examiner—Ferris Lander
Attorney, Agent, or Firm—Breiner & Breiner

[57] ABSTRACT

A storage-stable dispersion providing melamine in the form of a concentrated liquid for effective use as an end product or as an ingredient for conversion into other products. The dispersion contains melamine particles finer than about 50 microns in diameter, admixed with a chemically inert suspending liquid, having a specific gravity between 0.9 and 1.3 grams per milliliter, containing between 0.03 and 0.20 percent of a chemically inert thickening agent, which interacts physically with the suspending liquid to increase viscosity to between 250 and 3000 centipoise, thereby substantially maintaining the melamine particles in a stable dispersion and preventing their settling. The dispersion composition is an effective form of melamine for accurate dispensing as an agricultural, pulp and paper, or fire-retardant ingredient. Effective thickening agents include xanthan gums, carrageenans, polyacrylamide, chemically treated cellulose, and clays. Nonionic surfactants are helpful in wetting the melamine particles with the suspending liquid. The suspending liquid may be water, aqueous solutions, hydrophilic organic polyols, and high molecular weight organic liquid polyols.

19 Claims, No Drawings

STORAGE-STABLE MELAMINE DISPERSION

BACKGROUND OF THE INVENTION

1. Field of the Invention

This invention relates to a new storage-stable melamine composition for improving the effectiveness of melamine use, and to a method for preparing the composition. More particularly, this invention relates to a composition of a storage-stable dispersion of melamine which provides concentrated melamine for direct use, or for conversion into other valuable products. Dust and handling losses normally incurred in handling dry melamine powder are virtually eliminated.

2. Description of Related Art

Melamine, 2,4,6-triamino-1,3,5-triazine, a white crystalline powder, with a water solubility at room temperature of 0.5% (5000 ppm) and nitrogen content of 66.67%, is a versatile chemical compound used primarily to react chemically with other compounds to prepare resins and plastics. Recently several important new uses for melamine, in the unreacted form, have been disclosed. Melamine has been reported to provide fire retardancy when incorporated into a variety of otherwise flammable materials, including plastic sheets and foams. Melamine also has been found to be valuable in agriculture as a plant food, a nitrification inhibitor, and a non-protein nitrogen ruminant feed supplement.

Melamine is conventionally shipped in bulk by tank truck and rail hopper car, or contained in large plastic bags containing about 1000 pounds, and, usually, in paper bags containing about 50 pounds. Melamine when received for further processing is usually a dusty powder containing some soft aggregates. Direct utilization of this commercial melamine product as an ingredient in resins, plastics, or agricultural formulations creates problems in storing, conveying, and dispensing because melamine dust is lost, and it has a tendency to aggregate to form a powder bridge across openings, clogging chutes, conveyors or other transfer or storage equipment. The dust lost in the handling process is irritating to workers, economically costly, and requires installation of dust-venting systems.

Various techniques have been disclosed in the art to ease the problems of handling melamine. All of the techniques disclosed require undesirable additional chemical reactions or substantial dilutions. In U.S. Pat. No. 2,603,614, Nieson and Nason prepared a glow proofing compound from a phenolic resin, and the chemical reaction product of melamine, formaldehyde, and phosphorus pentoxide. The final reaction product was a dry powder which could be handled by suspending in water with the aid of dispersing agents. The suspension was applied to fibrous materials which were then formed into insulating blocks. Considerable effort and cost were required to put the melamine powder in a useful form.

Wohnsiedler and Thomas in U.S. Pat. No. 2,485,079 disclosed a colloidal melamine-urea-formaldehyde copolymer solution to impart good flame-proofing to cotton fibers. The solution was prepared from urea and melamine chemically reacted with formaldehyde by means of an acid catalyst. The processing and dilution of melamine required to make the copolymer useful was extensive.

Handling melamine in the preparation of plastics was improved by Tzeng and Moore in U.S. Pat. No. 2,797,206, disclosing a stable melamine-urea-formaldehyde sirup formed by the base catalyzed reaction of urea-formaldehyde and melamine in aqueous methanol solution. Melamine was put in stable form but chemical reaction was required.

In a similar manner, David Chalmers disclosed, in British Patent No. 889,260, another stable melamine-formaldehyde resin sirup also using formaldehyde in aqueous methanol as a reactant, but with dicyandiamide added as a stabilizer. Methanol is undesirable in many melamine uses and dicyandiamide is costly material which also is not desirable in some melamine uses.

Izumi, Kitto, and Ito in Japanese Kokai 73/31,291 disclose an example of the very complicated procedures developed for the effective use of melamine. This publication teaches improvements in the solubility and storage stability of melamine by preparation of a melamine formaldehyde preconcentrate containing large amounts of stabilizing tetramethylolmelamine, by dissolving a formaldehyde-melamine preconcentrate in a pyridine-chloroform mixture and then fractionating the solution into desirable materials by treatment in a cellulose-filled absorption column.

Melamine has been found to be an effective fire retardant for plastic forms, including foams. To prepare these materials, melamine has been used as a solid or in the liquid resin form, usually as a melamine-formaldehyde concentrate, pre-resin, or resin. The formaldehyde has been used because it offers a convenient way of handling the melamine as a liquid, and facilitates its introduction into the final fire-retardant product. Unfortunately, formaldehyde dilutes the melamine and reduces flame retardancy of the final product. The use of melamine as a solid presents the problems normally associated with the use of fine particle powders.

Oesterreichische Stickstoffwerke A.G. disclosed in French Patent No. 2,102,029 preparation of fire-resistant moldings from substantial amounts of melamine mixed with polyurethane or epoxy resins in a mold at room temperature. The components are held overnight in a mold to harden, and then unmolded to produce epoxy or urethane plastics with low combustibility ratings. Preparation of a flame-retarding fine cell polyurethane foam by a similar method was also disclosed. Unfortunately, no convenient method for introducing the melamine into the reaction mixture was suggested.

Melamine has been used in agriculture as a fertilizer, a foliar feed, and as a ruminant feed supplement. Ludecke and Nitzsche in *Ger. Landwirtch. Forsch.* 11, 167-78 (1958), reported that spraying dilute melamine solution on sugar beet foliage significantly increased yield at suitable melamine solution concentrations in water.

Another agricultural use reported for melamine is that of a protein substitute in ruminant feed supplements. B. B. Wilson discloses in U.S. Pat. No. 3,653,909 that melamine included in ruminant feed supplements improves the nitrogen intake of the animals consuming it, and increases the desirable production of volatile fatty acids in the rumen of the animals. The liquid supplement contained urea, salt, melamine, minerals, vitamins, ammonium polyphosphate solution, water, and molasses. The melamine used in the liquid supplements was limited to minor concentrations, and was blended with many other materials.

The melamine compositions and methods described briefly in the foregoing paragraphs utilized various modifications of melamine to make the melamine suitable for handling, storing, or conversion to other end use products. Most of these compositions involved significant dilutions of melamine, the chemical reaction of melamine with other ingredients to form storage-stable liquids, or the inclusion of melamine with substantial amounts of additives which could affect the properties of melamine. In many uses it is undesirable to have melamine diluted, chemically reacted, or mixed with substantial amounts of other materials. The use of melamine as the undiluted compound is particularly important where the melamine is to be used as a fire-retarding agent, or as an agricultural product. None of the prior art disclosed a concentrated storage-stable liquid dispersion of melamine containing inconsequentially low concentrations of suspending agents; and no method is suggested for preparing such a dispersion.

SUMMARY OF THE INVENTION

It is an object of this invention to provide a new storage-stable, concentrated, melamine dispersion composition exhibiting the requisite properties for effective use of melamine as a liquid.

It is another object to provide a liquid melamine dispersion for the effective use of melamine as an agricultural chemical.

It is a further object to provide a melamine dispersion for the effective use of melamine as a liquid fireretarding ingredient for resins and plastics.

It is a further object to provide a method of preparing the new melamine compositions.

The instant invention is a storage-stable concentrated liquid melamine dispersion composition containing melamine particles which are 150 microns and smaller in diameter, admixed with a suspending liquid at a concentration of melamine between 10 and 70 percent. The suspending liquid is chemically inert toward melamine and exhibits a density of about 1.0 grams per milliliter. The composition also contains a thickening agent which is chemically inert with melamine and the suspending liquid, but which physically interacts at inconsequentially low concentrations of 2 percent or less, with the suspending liquid to cause sufficient viscosity in the composition to substantially maintain the melamine particles as a dispersion thereby preventing settling.

Surprisingly, when the required concentration of melamine particles are admixed with a suspending liquid, the amount of thickener required to maintain the melamine particles as a dispersion is inconsequentially small. For the new composition to be effective, it is necessary that the melamine particles be fine, substantially 150 microns in diameter, and preferably 50 microns or less. The concentration of melamine particles in the suspending liquid required to hold the amount of thickener to an inconsequentially low level depends to some extent on the melamine particle sizes contained in the dispersion, ranging from about 10 percent for very fine melamine particles to about 70 percent for particles with about 150 micron diameters.

It was discovered that the suspending liquids with which the melamine particles may be satisfactorily admixed must have the ability to wet the melamine particles while being chemically inert with them. To maintain the dispersion it was necessary that the density of the suspending liquid be about 1 gram per milliliter.

The thickening agent contained in the composition of this invention not only must be chemically inert to both melamine and the suspending liquid, but also must interact physically with the suspending liquid to cause viscosity to increase in the dispersion sufficiently to maintain the melamine particles in suspension. At the same time, the viscosity increase must be limited so that the melamine dispersion is readily pumpable through pipes, valves, and nozzles. The physical interaction of the thickening agent is not completely understood but consists in the swelling of the agent with the establishment of lightly bonded support ligands throughout the dispersion.

DETAILED DESCRIPTION OF THE INVENTION

The instant invention is directed to a new dispersion composition which provides melamine for convenient and effective use as a liquid, particularly in the fields of fire-retardant resins and plastics and agricultural chemicals.

To be a storage-stable dispersion, the liquid composition must contain fine melamine particles, about 150 microns in diameter or smaller. Preferably, 90 percent of the melamine particles are finer than 50 microns. These particles are admixed in a suspending liquid in high concentrations so that the concentration of thickening agent required is inconsequentially low in the final dispersion product. The term "inconsequentially low" is used to indicate that the thickening agent has no effect on the inherent chemical and physical properties of melamine or its end use products such as resins, plastics, pulp, paper or agricultural chemicals; and has no substantial effect on the chemical assay of the melamine or its reaction products.

It was found that the required level of melamine particle concentration varied somewhat, depending upon the particle size range of the melamine, with very fine particles requiring lower concentrations of melamine for satisfactory dispersions. The dispersions were found to have good storage stability when the concentration of melamine particles admixed with the suspending liquid was between 10 and 70 percent, and preferably between 40 and 60 percent.

The "percent" term used throughout means percent by weight unless otherwise specified. "Good storage stability" as used throughout means that the dispersion may be stored without agitation for seven days or more without appreciable settling of solids from the dispersion and without the formation of any appreciable clear layer on top of the dispersion. "Good storage stability" also denotes that the dispersion is pumpable by normal centrifugal pumps and substantially free of lumps.

Although aqueous and organic liquids can be used as suspending liquids in the composition of this invention, the physical and chemical properties of the liquids selected must be in a narrow range. The suspending liquids in which the admixed melamine particles are dispersed, must wet the particles in substantially unchanged form and must be chemically inert with melamine. That is, the suspending liquid must not undergo any appreciable chemical change or reaction with melamine. To function as a suspending liquid, it was found necessary that the liquid exhibit a density of about 1 gram per milliliter, and preferably between 0.9 and 1.3 grams.

It is also necessary that the suspending liquid exhibit a low solvency for melamine. Compositions using suspending liquids with melamine solubilities exceeding 5 percent at 25° C. produced dispersions with poor storage stabilities, because the melamine particles grew substantially during storage and settled from the suspending liquid.

Water was found to be an effective suspending liquid, as were aqueous solutions, including those solutions including fertilizer compounds used as plant food solutions. Those solutions containing urea, methylolurea, ammonium phosphate, and potassium sulfate were found to be particularly effective because the density of the liquid was increased by the dissolved materials, which favors the use of inconsequentially small amounts of thickening agent, while the compounds did not affect the inert nature of the liquid toward melamine.

Hydrophilic organic liquid aliphatic polyols containing 2 to 6 skeletal carbon atoms were found to be effective suspending liquids behaving in much the same way as aqueous liquids, including the use of the same thickening agents. Ethylene, propylene, and diethylene glycols are typical of these compounds which function effectively. The term "hydrophilic" is used here to describe liquids which are substantially water soluble.

High molecular weight liquid organic polyols also were found to be usable as suspending liquids. Typical of these liquids are polyols made by the reaction of alkyl oxides with aliphatic alcohols or glycols, oils, phenol, fatty acids, or mixtures of these materials. These liquids have molecular weights of about 200 to 2000. Long chain polymeric aliphatic polyols, such as polypropylene glycol, exhibiting viscosities above 200 centipoise at 25° C. are considered here to be high molecular weight liquid organic polyols, and served effectively as suspending liquids. The thickeners useful in the high molecular weight polyols generally were different from those used with the hydrophilic liquids. It was necessary for the thickener to be miscible with the suspending liquid because the high molecular weight organic polyol liquids generally were low in solubility for water, or "hydrophobic."

Texaco Polypropylene Glycol 2000 and BASF-Wyandotte Pluracol C-133 are commercially available high molecular weight liquid organic polyols which are used as ingredients for reaction with urethane pre-resins to produce polyurethane plastics including foams. These polyols were found to be satisfactory suspending liquids when used with a thickening agent which is swelled to increase their viscosities. The term "high molecular weight liquid organic polyol" is used here to define organic chemicals containing more than 6 skeletal carbon atoms and multiple hydroxyl groups, which exhibit liquid properties and kinematic viscosities between 300 and 10,000 centipoise at 25° C.

A key ingredient in the composition of this invention is the thickening agent which must be chemically inert with both melamine and the suspending liquid or the dispersion will be unstable and of no practical value. In addition, it was found that the thickening agent must interact physically with the suspending liquid at inconsequentially low concentrations to cause sufficient viscosity to substantially maintain the melamine particles as a stable dispersion.

It has been found that thickeners used in concentrations of 2 percent or less in melamine dispersion liquids, cause no discernible changes in the use of melamine, or in the reaction products which can be formed from melamine. Thus, thickener concentrations of 2 percent or less are considered here to be "inconsequentially small." Thickener concentrations which effectively maintain the melamine dispersions in the composition of this invention were found to be about 0.03 to 2.0 percent. Higher concentrations cause dispersions which are either solid or too thick for practical use, while concentrations lower than 0.03 percent fail to maintain melamine particles in a stable dispersion. The preferable thickener concentrations are between 0.06 and 0.20 percent.

It was found that the viscosity of the liquid required to produce a stable dispersion depends somewhat on the particle size of the melamine, and that a viscosity of about 250 centipoise was the minimum required to produce a stable dispersion. Dispersions with viscosities as high as 15,000 centipoise could be handled effectively in the instant dispersion. The viscosities referred to herein are kinematic viscosities measured with a Brookfield Viscosimeter at 25° C.

Thickening agents which are capable of forming stable gels with the suspending liquids were found to be effective in the compositions of this invention. The selection of the thickener depends to some extent upon the suspending liquid used and the end use of the dispersion. Xanthan gums and carrageenan are refined natural gums which were used as thickeners at very low concentrations in systems utilizing aqueous suspending liquids. A xanthan gum may be defined as an exocellular biopolysaccharide, produced in a pure culture fermentation process by the microorganism *Xanthomonas campestris*. Carrageenan is a gum derived by refining naturally occurring seaweed. Iota-carrageenan is the most effective carrageenan in the instant compositions.

The above thickeners were also effective in hydrophilic liquid organic polyols containing 2 to 6 skeletal carbon atoms where the xanthan gums and carrageenans swelled and formed weak bonding support ligands throughout the suspending liquids. These thickeners had low solubility rates in high molecular weight polyols, but were effective thickeners in those polyols when they were first dissolved in a polar solvent, such as ethylene or propylene glycol, which is also soluble in the polyol. The solvent may also advantageously contain sufficient water to increase the solubility of the gums. Polyacrylamide polymers are effective thickeners at similar low concentrations in high molecular weight liquid organic polyols without addition of polar solvents.

Satisfactory dispersion compositions were obtained when chemically refined cellulose was included as a thickening agent. Effective celluloses in aqueous suspending liquids included hydroxyalkylcellulose, and alkoxyalkylcellulose, preferably hydroxyethylcellulose and carboxymethylcellulose. Higher concentrations of cellulose-based thickeners were required than the concentrations of xanthan gums and carrageenans, but these higher concentrations are still inconsequentially small.

Several clays were also found to be effective thickeners in the instant composition. Clays found effective with aqueous suspending liquids were Montmorillonite, Palygorskite, and Kaolinite. The amount of clay required was several-fold that of xanthan gum but still inconsequentially low at 1 to 2 percent of the composition.

Thorough wetting of the melamine particles with the suspending liquid is necessary in the storage-stable melamine dispersion composition of this invention for preventing aggregation of the melamine particles. Non-ionic surfactants admixed with the suspending liquid were found to improve wetting of the melamine particles without affecting the properties of melamine. Ionic surfactants interfered with some of the end uses of melamine and were not generally acceptable for inclusion with the instant compositions. The level of surfactant required for effective performance was low, amounting to between 0.05 and 0.10 percent of the total liquid.

A storage-stable concentrated melamine liquid dispersion composition has been discovered for effectively handling melamine as an agricultural chemical, which comprises: fine melamine particles, 90 percent of which are smaller than 50 microns in diameter, admixed in a suspending liquid in concentrations between 10 and 70 percent; an aqueous suspending liquid having a density between 0.9 and 1.3 grams per milliliters, in which the admixed melamine particles are wetted but chemically unchanged; a watersoluble alkoxylated fatty acid nonionic surfactant, such as propoxylated castor oil, admixed with the aqueous suspending liquid at a concentration between 0.03 and 0.20 percent of the melamine dispersion composition to improve the wetting of the melamine particles; and a xanthan gum or iota carrageenan thickening agent, amounting to between 0.08 and 0.20 percent, which interacts physically with the aqueous suspending liquid to cause a viscosity therein between 500 and 2000 centipoise, thereby substantially maintaining the melamine particles in stable dispersion.

It was found that the compositions of this invention could be prepared by the method of admixing all of the required ingredients. It was also found that a storagestable melamine dispersion effective as a liquid agricultural chemical could be prepared by the method of admixing the ingredients cited above.

MODE OF OPERATION OF INVENTION

Having described the basic concepts of the instant invention, reference is now made to the following examples which are provided to illustrate the presently preferred method for carrying out the invention. All parts and percentages are by weight unless otherwise specified.

EXAMPLE 1

This example demonstrates a storage-stable liquid melamine dispersion containing water as the suspending liquid, alkoxylated fatty acid surfactant, and xanthan gum as the thickening agent.

To the 2-liter glass pitcher of a laboratory Waring Blender at ambient temperature was added, in the order listed, the ingredients listed as follows:

| Ingredients | Wt, grams |
| --- | --- |
| Water | 543.8 |
| Surfactol 365 | 1.0 |
| Melamine | 454.5 |
| Kelzan-s | 0.7 |
| Total | 1000.0 |

The melamine particles were very fine. Screen analysis showed that 10 percent of the particles were retained on a screen with openings of 45 microns and 90 percent passed through the screen. The melamine used was a commercially produced material, recovered from the dust control system of the melamine plant. Substantial amounts of dust were lost into the air and settled on equipment and surfaces in the area of use, when the melamine was poured from a commercial 50 pound bag into a beaker.

Water with a density of 1.0 gram per milliliter served as the suspending liquid. It dissolved 0.3 percent melamine and was chemically inert to the melamine.

Surfactol 365 was added to the water to facilitate the wetting of the melamine particles. Surfactol 365 is a water-soluble nonionic liquid surfactant composed of polypropoxy fatty acid (castor oil) having a hydroxyl number of 80, an Iodine number of 36 and a saponification value of 68. This surfactant produced by CasChem, Inc. has a viscosity of 4.7 centipoise at 25° C.

After the melamine particles were dispersed in the water, Kelzan-s was added, in the form of a light powder, as a thickener. The Waring Blender was then operated at its highest speed for 2 minutes, with the dispersion becoming thick and creamy. Viscosity was measured to be 560 centipoise at 25° C. with a Brookfield Kinematic Viscosimeter.

The Kelzan-s is a water-soluble xanthan gum which is chemically inert toward melamine. It is produced by the Kelco Division of Merck and Company, Inc. Xanthan gums are high molecular weight natural polysaccharides prepared in the exocellular biopolysaccharide form in a pure cultural fermentation by the microorganism Xanthomonas campestris.

After the dispersion was prepared, it was placed in a closed bottle and allowed to stand overnight at ambient temperature. The thickener continued its gelling process, forming more weak support ligands throughout the dispersion so that the viscosity had increased to 750 centipoise after 24 hours.

Samples of the dispersions were poured into standard 250 ml graduated cylinders, the tops were covered to prevent evaporation, and then stored for stability observations. After 7 days, the clear layer at the top of the cylinder and the settled solids on the bottom each amounted to less than 3 milliliters. After 30 days those two layers still amounted to less than 10 milliliters, and the liquid dispersion was poured evenly from the cylinders with no lumps. Final viscosity measured was 770 centipoise.

EXAMPLE 2

This example demonstrates a storage-stable liquid melamine dispersion containing aqueous plant foods as the suspending liquid, and iota carrageenan as the thickener.

To a 30-gallon plastic vessel equipped with an electrically driven turbine-type agitator at ambient temperature of 26° C. was added in the order listed, the ingredients as follows:

| Ingredients | Wt, lbs |
| --- | --- |
| Methylolurea-urea solution | 92.30 |
| Thompson-Hayward Surfactant TDET, DD-5 | 0.15 |
| Melamine | 117.50 |
| Gelcarin-DG | 0.13 |
| Total | 210.08 |

The methylolurea-urea solution was commercially available Formolene containing 44 percent methylolurea, 31 percent urea, 16.8 percent water, and small amounts of ammonia, methyleneurea, and potassium bicarbonate. The Formolene contained 30 percent total nitrogen. The melamine particles were fine, with 11 percent of the particles having diameters larger than 50 microns, with about 21 percent of the particles having diameters of about 50 microns, and the remaining 68 percent having diameters smaller than 50 microns. When the melamine was poured from 50 pound bags into the plastic mixing vessel, dust was emitted and some of it was lost onto the surrounding surfaces. The bags contained several lumps which required substantial pressure to crush.

The methylolurea-urea solution dissolved less than 1 percent melamine and had a density of 1.28 grams per milliliter at 25° C. It was chemically inert toward melamine and served effectively as a suspending liquid.

Thompson-Hayward Surfactant TDET, DD-5 is a commercial surfactant composed of nonylphenol reacted with about 5 or more molecules of ethylene oxide. It is a low viscosity liquid which allowed the melamine powder to be rapidly wetted by the methylolurea-urea solution suspending liquid.

The Gelcarin-DG thickener was thoroughly blended into the melamine dispersion which was then allowed to sit overnight in the plastic container. After 24 hours the viscosity was measured to be 710 centipoise. Gelcarin-DG is a commercial iota carrageenan produced by the Marine Colloids Division of the FMC Corporation. It is produced by refining naturally occurring marine red algae (Rhodophyceae). The chemical structure is complex, containing repeating galactose units, and the molecular weight is between 100,000 and 500,000.

There was no discernible clear layer on top of the dispersion after 30 days storage, and the liquid including all of the solids was pumped from the vessel with a regular centrifugal pump with no difficulty. No residual solids remained on the bottom of the vessel.

EXAMPLE 3

This example demonstrates the utility of the instant composition as an agricultural chemical.

The dispersion composition prepared in Example 1 was analyzed and found to contain 40.0 percent total melamine nitrogen, an unusually high nitrogen content for a liquid agricultural chemical. Into this dispersion was admixed 5 percent commercial liquid hexazinone herbicide containing 2 pounds hexazinone active ingredient per gallon of the liquid herbicide. The resulting mixture was sprayed without difficulty at a rate of about 2 pounds of hexazinone and 80 pounds of melamine nitrogen per acre onto a field of one year old Douglas-Fir trees. Control of herbaceous weeds and the growth of the tree seedlings were both superior to control areas treated with the same amount of hexazinone without melamine.

EXAMPLE 4

This example demonstrates the utility of the instant invention as a complete liquid fertilizer.

In the equipment used in Example 1 was admixed, in the order listed, the ingredients listed as follows:

| Ingredients | Wt. grams |
| --- | --- |
| Water | 60.0 |
| Melamine | 56.0 |
| Surfactol 365 | 0.2 |
| Kelzan-s | 0.2 |
| Total | 116.4 |

The melamine was added to the water as a dusty powder while the blender operated at low speed. The Kelzans was added as a dry powder using high shear agitation for 2 minutes to produce a stable melamine dispersion.

A liquid fertilizer was prepared in a 2-liter beaker by mixing the ingredients listed as follows:

| Ingredients | Wt. grams |
| --- | --- |
| Water at 60° C. | 319.7 |
| Dipotassium Phosphate | 277.2 |
| Diammonium Phosphate | 73.2 |
| Urea | 211.1 |
| Surfactol 365 | 0.6 |
| Kelzan-s | 1.8 |
| Total | 883.6 |

The melamine dispersion was poured into the liquid fertilizer and stirred to form a complete stable liquid fertilizer which had a viscosity of 770 centipoise at 25° C. after overnight storage. The nutrient component percentages were 15 nitrogen, 15 phosphate, and 15 potassium with one fourth of the nitrogen contributed by slowly degradable melamine.

This dispersion was sprayed directly onto Kentucky Bluegrass turf at a rate of 1 pound of nitrogen per thousand square feet of turf where it functioned effectively as a complete fertilizer.

EXAMPLE 5

This example demonstrates the instant invention utilizing a hydrophilic organic polyol as the suspending liquid.

In the equipment of Example 1 was added, in the order listed, the ingredients listed as follows:

| Ingredients | Wt, grams |
| --- | --- |
| Ethylene glycol | 678.5 |
| Surfactol 365 | 1.0 |
| Melamine | 320.0 |
| Kelzan-s | 0.5 |
| Total | 1000.0 |

The Surfactol 365 was added to the fiber grade ethylene glycol in the Waring Blender. Melamine, 90 percent of which passed through a 45 micron screen, was dispersed with the blender operating at low speed. The Kelzan-s thickener was added, and the blender was operated at high speed for 2 minutes.

The gelling of the Kelzan-s was slower in the glycol than in aqueous liquids. The initial viscosity of the final dispersion was 250 centipoise. After 24 hours storage, viscosity was 510, and after 72 hours it was 770 tipoise. No appreciable viscosity increase occurred thereafter and the dispersion was stable during a 30 day storage period.

Polyethyleneterephthalate polymer was prepared by the reaction of 1 gram mole of the ethylene glycol in this dispersion composition with 1 gram mole of terephthalic acid at 130° C. The polymer product obtained was suitable for inclusion in fire-retarding materials.

EXAMPLE 6

This example demonstrates the instant invention utilizing a xanthan gum, in a polar solvent containing ethylene glycol and water as thickener, in high molecular weight polyols.

A thickener concentrate was prepared at ambient temperature by adding in order to a blender the ingredients listed as follows:

| Ingredients | Weight % |
| --- | --- |
| Ethylene glycol | 77.5 |
| Water | 19.7 |
| Kelzan-s | 2.8 |

The liquid mixture was blended with strong shearing action until the mixture gelled and became thick. The thickener was reserved for later use.

A high molecular weight polyol, P-924, was obtained from the BASF-Wyandotte Co. which had a kinematic viscosity of 800 centipoise at 68° F., and commercial melamine powder was screened so that 98 percent of its particles had diameters of 150 microns or less.

In the equipment of this example, ingredients were added in the order listed as follows:

| Ingredients | Weight % |
| --- | --- |
| Polyglycol P-924 | 48.0 |
| Melamine | 48.0 |
| Thickener Concentrate | 4.0 |

The binder was operated at high speed for one minute, and the product was recovered and stored in a quiet container. Initially the product was a creamy, flowable dispersion having a kinematic viscosity of 12,000 centipoise at 68° F. After forty days storage, there was substantially no settling of solids from the dispersion and only a trace of clear polyol on top of the dispersion. The mixture was rendered homogeneous and ready for conversion into fireresistant polyurethane by a slight amount of stirring after the long period of storage.

EXAMPLE 7

To a 2-liter glass pitcher of a laboratory Waring Blender at ambient temperature was added in the order listed the ingredients as follows:

| Ingredients | Weight % |
| --- | --- |
| Ammonium polyphosphate (10-34-0 where the phosphorus is present at $P_2O_5$) | 1.0 |
| A urea-water solution which is 20% nitrogen made up of 43.48% urea, 56.52% water, 15% attapulgus clay in water (20% clay/80% water) | 77.0 |
| Melamine | 7.0 |

As will be apparent to one skilled in the art, various modifications can be made within the scope of the aforesaid description. Such modifications being within the ability of one skilled in the art form a part of the present invention and are embraced by the appended claims.

It is claimed:

1. A storage-stable concentrated liquid dispersion of melamine comprising
   (a) 10-70% by weight of fine melamine particles having a diameter no greater than about 150 microns;
   (b) a suspending liquid for said melamine particles, said liquid being chemically inert with melamine, and exhibiting a density of about 1 gram per milliliter; and
   (c) a thickening agent dispersed at inconsequentially low concentrations in said suspending liquid, the thickening agent exhibiting chemical inertness with melamine and said suspending liquid, but interacting physically with said suspending liquid to cause a viscosity sufficient to substantially maintain the melamine particles in a stable dispersion.

2. The dispersion of claim 1 wherein 10 percent of the fine melamine particles are about 50 microns in diameter and 90 percent are finer.

3. The dispersion of claim 1 wherein the melamine concentration is between 40 and 60 percent.

4. The dispersion of claim 1 wherein the solubility of melamine in the suspending liquid is between 0 and 5 percent at 25° C.

5. The dispersion of claim 1 wherein the density of the suspending liquid is between 0.9 and 1.3 grams per milliliter.

6. The dispersion of claim 1, wherein the concentration of the thickening agent is between 0.03 and 2.0 percent of the dispersion.

7. The dispersion of claim 1, wherein the concentration of the thickening agent is between 0.06 and 0.20 percent of the dispersion.

8. The dispersion of claim 1 wherein the viscosity is between 250 and 15,000 centipoise at about 25° C.

9. The dispersion of claim 1 wherein the thickening agent is a refined natural gum capable of forming a stable viscous aqueous gel selected from the group consisting of xanthun gum, carrageenan, hydroxyalkylcellulose, and carboxylkylcellulose.

10. The dispersion of claim 1 wherein the thickening agent is polyacrylamide.

11. The dispersion of claim 1 wherein the thickening agent is a clay selected from the group consisting of Montmorillonite, Palygorskite, and Kaolinite.

12. The dispersion of claim 1 wherein a nonionic surfactant is admixed with the suspending liquid to improve its wetting of the melamine particle.

13. The dispersion of claim 1 wherein the suspending liquid is water.

14. The dispersion of claim 1 wherein the suspending liquid is an aqueous plant food solution containing one or more nutrients selected from the group consisting of urea, methylolurea, methyleneurea, ammonium phosphate, potassium chloride, potassium nitrate, and ammonium nitrate.

15. The dispersion of claim 1 wherein the suspending liquid is a hydrophilic organic polyol compound containing between 2 and 6 skeletal carbons in its chemical formula.

16. The melamine dispersion of claim 1 wherein the suspending liquid is a high molecular weight liquid organic polyol.

17. A method of preparing a storage-stable melamine dispersion comprising admixing the ingredients of claim 1.

18. A storage-stable concentrated liquid dispersion composition for effectively handling melamine as an agricultural chemical comprising:
   (a) 10 to 70% by weight fine melamine particles, at least 90 percent of which have diameters smaller than 50 microns;
   (b) an aqueous suspending liquid, exhibiting a density between 0.9 and 1.3 grams per milliliter, and in which dispersed melamine particles are chemically unchanged;
   (c) a water-soluble alkoxylated fatty acid nonionic surfactant admixed with said aqueous suspending liquid at a concentration of between 0.03 and 0.20 percent of the dispersion; and (d) a refined natural gum selected from the group consisting of xanthan gum and iota carrageenan, amounting to between 0.08 and 0.20 percent of the dispersion, and which physically interacts with said aqueous suspending liquid to cause a viscosity between 500 and 2000 centipoise, thereby substantially maintaining the melamine particles in stable dispersion.

19. A method of preparing a storage-stable melamine dispersion effective as a liquid agricultural chemical comprising the admixing of the ingredients of claim 18.

* * * * *